United States Patent
Son et al.

(10) Patent No.: US 10,550,738 B2
(45) Date of Patent: Feb. 4, 2020

(54) CONTINUOUSLY VARIABLE VALVE DURATION APPARATUS AND ENGINE PROVIDED WITH THE SAME

(71) Applicants: HYUNDAI MOTOR COMPANY, Seoul (KR); KIA MOTORS CORPORATION, Seoul (KR)

(72) Inventors: You Sang Son, Suwon-si (KR); Ingee Suh, Yongin-si (KR); Kiyoung Kwon, Yongin-si (KR); In Sang Ryu, Incheon (KR); Kyoung Pyo Ha, Seongnam-si (KR); Dongheon Park, Seongnam-si (KR); Wootae Kim, Anyang-si (KR); Back Sik Kim, Osan-si (KR); Seung Jae Lee, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/169,578

(22) Filed: Oct. 24, 2018

(65) Prior Publication Data

US 2019/0153913 A1    May 23, 2019

(30) Foreign Application Priority Data

Nov. 20, 2017    (KR) .................. 10-2017-0154705

(51) Int. Cl.
*F01L 13/00* (2006.01)
*F01L 1/352* (2006.01)
(Continued)

(52) U.S. Cl.
CPC .......... *F01L 13/0015* (2013.01); *F01L 1/0532* (2013.01); *F01L 1/08* (2013.01);
(Continued)

(58) Field of Classification Search
CPC ....... F01L 2001/0473; F01L 2001/0476; F01L 1/267; F01L 1/46; F01L 2013/0089; F02D 13/0215; F02D 13/0234; F02D 13/0249
(Continued)

(56) References Cited

U.S. PATENT DOCUMENTS

| 3,633,555 A | 1/1972 | Raggi |
| 4,552,112 A | 11/1985 | Nagao et al. |

(Continued)

FOREIGN PATENT DOCUMENTS

| JP | H07-042514 A | 1/1995 |
| JP | H07-180514 A | 7/1995 |

(Continued)

OTHER PUBLICATIONS

Non-Final Office Action dated Jul. 9, 2019 from the corresponding U.S. Appl. No. 15/839,624, 9 pages.
(Continued)

*Primary Examiner* — Jorge L Leon, Jr.
(74) *Attorney, Agent, or Firm* — Brinks Gilson & Lione

(57) ABSTRACT

A continuously variable valve duration apparatus may include: a camshaft; a cam unit on which a cam is formed, and the camshaft inserted to the cam; an inner wheel for transmitting rotation of the camshaft to the cam unit; a wheel housing into which the inner wheel is rotatably inserted and movable perpendicular to the camshaft; a guide shaft on which a guide screw thread is formed and disposed perpendicular to the camshaft; a worm wheel formed with an inner screw thread for engaging with the guide screw thread, and the worm wheel disposed within the wheel housing; and a control shaft on which a control worm for engaging with the worm wheel is formed.

16 Claims, 19 Drawing Sheets

(51) Int. Cl.
- *F01L 1/053* (2006.01)
- *F01L 1/08* (2006.01)
- *F01L 1/34* (2006.01)
- *F01L 1/047* (2006.01)
- *F02D 41/00* (2006.01)

(52) U.S. Cl.
CPC .............. *F01L 1/34* (2013.01); *F01L 1/352* (2013.01); *F01L 2001/0476* (2013.01); *F01L 2001/0537* (2013.01); *F01L 2013/0084* (2013.01); *F01L 2013/103* (2013.01); *F02D 41/009* (2013.01)

(58) Field of Classification Search
USPC ........................................................ 123/90.17
See application file for complete search history.

(56) References Cited

U.S. PATENT DOCUMENTS

| | | |
|---|---|---|
| 5,080,055 A | 1/1992 | Komatsu et al. |
| 5,121,733 A | 6/1992 | Goto et al. |
| 5,161,497 A | 11/1992 | Simko et al. |
| 5,224,460 A | 7/1993 | Havstad et al. |
| 5,419,301 A | 5/1995 | Schechter |
| 5,421,308 A | 6/1995 | Hitomi et al. |
| 5,429,100 A | 7/1995 | Goto et al. |
| 5,450,824 A | 9/1995 | Yamane et al. |
| 5,469,818 A | 11/1995 | Yoshioka et al. |
| 5,553,573 A | 9/1996 | Hara et al. |
| 5,622,144 A | 4/1997 | Nakamura et al. |
| 5,687,681 A | 11/1997 | Hara |
| 5,698,779 A | 12/1997 | Yoshioka |
| 5,778,840 A | 7/1998 | Murata et al. |
| 5,809,955 A | 9/1998 | Murata et al. |
| 5,924,334 A | 7/1999 | Hara et al. |
| 5,988,125 A | 11/1999 | Hara et al. |
| 5,992,361 A | 11/1999 | Murata et al. |
| 6,006,707 A | 12/1999 | Ito |
| 6,125,801 A | 10/2000 | Mendler |
| 6,318,343 B1 | 11/2001 | Nakagawa et al. |
| 6,336,436 B1 | 1/2002 | Miyakubo et al. |
| 6,408,806 B2 | 6/2002 | Sugiyama et al. |
| 6,553,949 B1 | 4/2003 | Kolmanovsky et al. |
| 6,619,249 B2 | 9/2003 | Sakuragi et al. |
| 6,647,935 B2 | 11/2003 | Aoyama et al. |
| 6,659,054 B2 | 12/2003 | Sugiyama et al. |
| 6,792,924 B2 | 9/2004 | Aoyama et al. |
| 6,837,199 B2 | 1/2005 | Matsuura et al. |
| 6,886,532 B2 | 5/2005 | Nohara et al. |
| 7,021,277 B2 | 4/2006 | Kuo et al. |
| 7,328,675 B2 | 2/2008 | Seitz et al. |
| 7,793,625 B2 | 9/2010 | Nakamura et al. |
| 7,823,550 B2 | 11/2010 | Murata |
| 7,840,335 B2 | 11/2010 | Akihisa et al. |
| 8,205,587 B2 | 6/2012 | Murata |
| 8,235,015 B2 | 8/2012 | Murata |
| 8,322,315 B2 | 12/2012 | Akihisa et al. |
| 8,352,157 B2 | 1/2013 | Akihisa et al. |
| 8,413,618 B2 | 4/2013 | Kamiyama et al. |
| 8,666,640 B2 | 3/2014 | Nakatani et al. |
| 8,677,957 B2 | 3/2014 | Goto et al. |
| 8,695,544 B2 | 4/2014 | Sawada et al. |
| 8,887,691 B2 | 11/2014 | Chen et al. |
| 8,983,753 B2 | 3/2015 | Rayl |
| 9,127,601 B2 | 9/2015 | Cowgill et al. |
| 9,863,331 B2 | 1/2018 | Ryu et al. |
| 9,863,340 B2 | 1/2018 | Ryu et al. |
| 9,874,153 B2 | 1/2018 | Ryu et al. |
| 9,874,154 B2 | 1/2018 | Ryu et al. |
| 9,879,619 B2 | 1/2018 | Ryu et al. |
| 9,889,838 B2 | 2/2018 | Ryu et al. |
| 9,903,281 B2 | 2/2018 | Ryu et al. |
| 9,932,883 B2 | 4/2018 | Iwai et al. |
| 9,932,908 B2 | 4/2018 | Ryu et al. |
| 9,964,050 B2 | 5/2018 | Ryu et al. |
| 10,006,378 B2 | 6/2018 | Ryu et al. |
| 10,415,485 B2 | 9/2019 | Ryu et al. |
| 10,415,488 B2 | 9/2019 | Ryu et al. |
| 10,428,747 B2 | 10/2019 | Ryu et al. |
| 2001/0025615 A1 | 10/2001 | Nohara et al. |
| 2001/0032605 A1 | 10/2001 | Kadowaki |
| 2001/0050067 A1 | 12/2001 | Sato |
| 2002/0043243 A1 | 4/2002 | Majima |
| 2003/0106542 A1 | 6/2003 | Aoyama et al. |
| 2003/0131805 A1 | 7/2003 | Yang |
| 2004/0099244 A1 | 5/2004 | Matsuura et al. |
| 2005/0087158 A1 | 4/2005 | Tanei |
| 2005/0205069 A1 | 9/2005 | Lewis et al. |
| 2005/0235933 A1 | 10/2005 | Arai et al. |
| 2006/0037571 A1 | 2/2006 | Machida |
| 2006/0266322 A1 | 11/2006 | Tomanik et al. |
| 2007/0181096 A1 | 8/2007 | Wagner et al. |
| 2008/0029050 A1 | 2/2008 | Ichmura et al. |
| 2008/0115750 A1* | 5/2008 | Hahn .................. F01L 1/047 123/90.17 |
| 2008/0300773 A1 | 12/2008 | Winstead |
| 2008/0308053 A1 | 12/2008 | Tsuchida |
| 2009/0000582 A1* | 1/2009 | Tanabe ................ F01L 1/022 123/90.17 |
| 2009/0007564 A1 | 1/2009 | Suzuki et al. |
| 2009/0007867 A1 | 1/2009 | Tanabe et al. |
| 2009/0031973 A1 | 2/2009 | Murata |
| 2009/0084333 A1 | 4/2009 | Cleary et al. |
| 2009/0241877 A1 | 10/2009 | Hoshikawa |
| 2009/0272363 A1 | 11/2009 | Yun et al. |
| 2009/0277434 A1 | 11/2009 | Surnilla |
| 2010/0023242 A1 | 1/2010 | Kawamura |
| 2010/0217504 A1 | 8/2010 | Fujii et al. |
| 2012/0000197 A1 | 1/2012 | Maruyama et al. |
| 2012/0004826 A1 | 1/2012 | Shimo et al. |
| 2013/0146006 A1 | 6/2013 | Kim et al. |
| 2013/0146037 A1 | 6/2013 | Han et al. |
| 2013/0206104 A1 | 8/2013 | Kuhlmeyer et al. |
| 2013/0213332 A1* | 8/2013 | Yano .................... F01L 1/34 123/90.17 |
| 2013/0276731 A1 | 10/2013 | Yano et al. |
| 2014/0165963 A1 | 6/2014 | Langham |
| 2015/0034052 A1 | 2/2015 | Shimizu |
| 2015/0114342 A1 | 4/2015 | Iwai et al. |
| 2015/0167508 A1 | 6/2015 | Ha |
| 2015/0167509 A1 | 6/2015 | Ha |
| 2016/0090877 A1 | 3/2016 | Kim et al. |
| 2016/0160706 A1* | 6/2016 | Son .................. F01L 13/0015 123/90.15 |
| 2016/0169066 A1* | 6/2016 | Son .................. F01L 13/0015 123/90.15 |
| 2017/0082036 A1 | 3/2017 | Kwon et al. |
| 2017/0082037 A1 | 3/2017 | Ryu et al. |
| 2017/0089230 A1 | 3/2017 | Son et al. |
| 2017/0114680 A1 | 4/2017 | Kim |
| 2017/0167318 A1 | 6/2017 | Ryu et al. |
| 2017/0167323 A1 | 6/2017 | Son et al. |
| 2017/0167393 A1 | 6/2017 | Ryu et al. |
| 2017/0167394 A1 | 6/2017 | Ryu et al. |
| 2017/0167396 A1 | 6/2017 | Ryu et al. |
| 2017/0167398 A1 | 6/2017 | Ryu et al. |
| 2017/0167399 A1 | 6/2017 | Ryu et al. |
| 2017/0167400 A1 | 6/2017 | Ryu et al. |
| 2017/0167401 A1 | 6/2017 | Ryu et al. |
| 2017/0167402 A1 | 6/2017 | Ryu et al. |
| 2017/0167403 A1 | 6/2017 | Ryu et al. |
| 2017/0167404 A1 | 6/2017 | Ryu et al. |
| 2017/0167405 A1 | 6/2017 | Ryu et al. |
| 2017/0167406 A1 | 6/2017 | Ryu et al. |
| 2017/0167407 A1 | 6/2017 | Ryu et al. |
| 2017/0167408 A1 | 6/2017 | Ryu et al. |
| 2017/0167409 A1 | 6/2017 | Ryu et al. |
| 2017/0167414 A1 | 6/2017 | Ryu et al. |
| 2017/0234243 A1 | 8/2017 | Ryu et al. |
| 2017/0268435 A1 | 9/2017 | Ryu et al. |
| 2017/0268436 A1 | 9/2017 | Ryu et al. |
| 2017/0268437 A1 | 9/2017 | Ryu et al. |
| 2017/0284235 A1 | 10/2017 | Son et al. |

(56) References Cited

U.S. PATENT DOCUMENTS

| | | |
|---|---|---|
| 2017/0284238 A1 | 10/2017 | Son et al. |
| 2018/0073455 A1 | 3/2018 | Barra |
| 2018/0100444 A1 | 4/2018 | Ryu et al. |
| 2018/0100445 A1 | 4/2018 | Ryu et al. |
| 2018/0100446 A1 | 4/2018 | Ryu et al. |
| 2018/0100447 A1 | 4/2018 | Ryu et al. |
| 2018/0100448 A1 | 4/2018 | Ryu et al. |
| 2018/0100452 A1 | 4/2018 | Ryu et al. |
| 2018/0100453 A1 | 4/2018 | Ryu et al. |
| 2018/0100454 A1 | 4/2018 | Ryu et al. |

FOREIGN PATENT DOCUMENTS

| | | |
|---|---|---|
| JP | H 07-324610 A | 12/1995 |
| JP | 10-318001 A | 12/1998 |
| JP | 2005-098150 A | 4/2005 |
| JP | 2006-046293 A | 2/2006 |
| JP | 2006-118381 A | 5/2006 |
| JP | 2006-336659 A | 12/2006 |
| JP | 2008-151059 A | 7/2008 |
| JP | 2008-274963 A | 11/2008 |
| JP | 2010-216464 A | 9/2010 |
| KR | 10-0321206 B1 | 1/2002 |
| KR | 10-2009-0013007 A | 2/2009 |
| WO | 2013-171830 A1 | 11/2013 |

OTHER PUBLICATIONS

Notice of Allowance dated Mar. 18, 2019 from the corresponding U.S. Appl. No. 15/839,581, 14 pages.
Final Office Action dated Mar. 18, 2019 from corresponding U.S. Appl. No. 15/840,079, 31 pages.
Non-Final Office Action dated Feb. 1, 2018 from the corresponding U.S. Appl. No. 15/840,079, 36 pages.
Non-Final Office Action dated May 16, 2018 from the corresponding U.S. Appl. No. 15/258,043, 9 pages.
Notice of Allowance dated May 16, 2018 from the corresponding U.S. Appl. No. 15/340,742, 52 pages.
Non-Final Office Action dated Aug. 24, 2018 from the corresponding U.S. Appl. No. 15/840,079, 41 pages.
Final Office Action dated Sep. 6, 2018 from the corresponding U.S. Appl. No. 15/258,154, 15 pages.
Non-Final Office Action dated Sep. 7, 2018 from the corresponding U.S. Appl. No. 15/839,581, 15 pages.
Non-Final Office Action dated Sep. 28, 2018 from the corresponding U.S. Appl. No. 15/839,606, 33 pages.
Non-Final Office Action dated Oct. 5, 2018 from the corresponding U.S. Appl. No. 15/839,626, 19 pages.
Non-Final Office Action dated Oct. 10, 2018 from the corresponding U.S. Appl. No. 15/839,596, 29 pages.
Extended European Search Report dated Mar. 4, 2019 from the corresponding European Application No. 18201117.1 (9 pages).
Final Office Action dated Apr. 11, 2019 from corresponding U.S. Appl. No. 15/839,606 (13 pages).
Non-Final Office Action dated Oct. 31, 2019 from the corresponding U.S. Appl. No. 15/839,028, 26 pages.

\* cited by examiner

Phase a    Phase b    Phase c    Phase d

CONTINUOUSLY VARIABLE VALVE DURATION APPARATUS AND ENGINE PROVIDED WITH THE SAME

CROSS-REFERENCE TO RELATED APPLICATION

This application claims priority to and the benefit of Korean Patent Application No. 10-2017-0154705, filed on Nov. 20, 2017, the entire contents of which are incorporated herein by reference.

FIELD

The present disclosure relates to a continuously variable valve duration apparatus and an engine provided with the same.

BACKGROUND

The statements in this section merely provide background information related to the present disclosure and may not constitute prior art.

An internal combustion engine generates power by burning fuel mixed with air in a combustion chamber. Intake valves are operated by a camshaft in order to introduce the air, and the air is drawn into the combustion chamber while the intake valves are open. In addition, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine. In order to achieve such optimal valve operation depending on the rotation speed of the engine, various researches, such as designing of a plurality of cams and a continuously variable valve lift (CVVL) that can change valve lift according to engine speed, have been undertaken.

Also, in order to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

However, the general CVVL and CVVT are complicated in construction and are expensive in manufacturing cost.

The above information disclosed in this Background section is only for enhancement of understanding of the background of the present disclosure and therefore it may contain information that does not form the prior art that is already known to a person of ordinary skill in the art.

SUMMARY

The present disclosure provides a continuously variable valve duration apparatus and an engine provided with the same so as to vary opening duration of a valve based on operation conditions of an engine with a simple construction.

In one form of the present disclosure, a continuously variable valve duration apparatus may include: a camshaft; a cam unit on which a cam is formed, and the camshaft inserted into the cam; an inner wheel configured for transmitting rotation of the camshaft to the cam unit; a wheel housing into which the inner wheel is rotatably inserted and movable perpendicular to the camshaft; a guide shaft on which a guide screw thread is formed and disposed perpendicular to the camshaft; a worm wheel to which an inner screw thread configured for engaging with the guide screw thread is formed therewithin and the worm wheel disposed within the wheel housing; and a control shaft on which a control worm configured for engaging with the worm wheel is formed.

The continuously variable valve duration apparatus according to an exemplary form of the present disclosure may further include a guide bracket to which the guide shaft is mounted.

A fixing hole to which the guide shaft is fixed and a moving space within which the wheel housing is movable may be formed in the guide bracket.

Two guide walls may be formed protruded from the wheel housing and a moving hole in which the guide shaft is inserted may be formed in each guide wall.

The worm wheel may be disposed between the two guide walls and configured to rotate to selectively push one of the two guide walls to move the wheel housing.

The continuously variable valve duration apparatus may further include a sliding shaft fixed to the guide bracket configured for guiding movement of the wheel housing, and a sliding hole into which the sliding shaft is inserted may be formed in the wheel housing.

The continuously variable valve duration apparatus may further include a worm shaft cap fixed to the guide bracket configured for supporting the control shaft.

A first sliding hole and a second sliding hole may be formed the inner wheel respectively, and a cam slot may be formed in the cam unit. The continuously variable valve duration apparatus may further include a roller wheel connected to the camshaft and rotatably inserted into the first sliding hole, and a roller cam slidably inserted into the cam slot and rotatabley inserted into the second sliding hole.

The roller cam may include a roller cam body slidably inserted into the cam slot, a cam head rotatably inserted into the second sliding hole and a protrusion formed for preventing the roller cam from being removed.

The roller wheel may include a wheel body slidably connected to the camshaft and a wheel head rotatably inserted into the first sliding hole.

A camshaft oil hole may be formed within the camshaft along a longitudinal direction thereof, a body oil hole communicated with the camshaft oil hole may be formed in the wheel body of the roller wheel, and an oil groove communicated with the body oil hole may be formed in the wheel head of the roller wheel.

The cam unit may include a first cam portion and a second cam portion which are disposed corresponding to a cylinder and an adjacent cylinder respectively, and the inner wheel may include a first inner wheel and a second inner wheel configured for transmitting a rotation of the camshaft to the first cam portion and the second cam portion respectively.

The first inner wheel and the second inner wheel may be connected rotatable to each other.

The continuously variable valve duration apparatus may further include a bearing disposed within the wheel housing and supporting the first inner wheel and the second inner wheel.

Two cams may be formed in the first cam portion and the second cam portion respectively, and a cam connecting portion may be formed between the two cams. The continuously variable valve duration apparatus may further include a cam cap on which a cam supporting portion configured for supporting the cam connecting portion may be formed.

An engine according to an exemplary form of the present disclosure may be provided with the continuously variable valve duration apparatus.

As described above, a continuously variable valve duration apparatus according to an exemplary form of the present disclosure may vary an opening duration of a valve according to operation conditions of an engine, with a simple construction.

The continuously variable valve duration apparatus according to an exemplary form of the present disclosure may be reduced in size and thus the entire height of a valve train may be reduced.

Since the continuously variable valve duration apparatus may be applied to an existing engine without excessive modification, thus productivity may be enhance and production cost may be reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
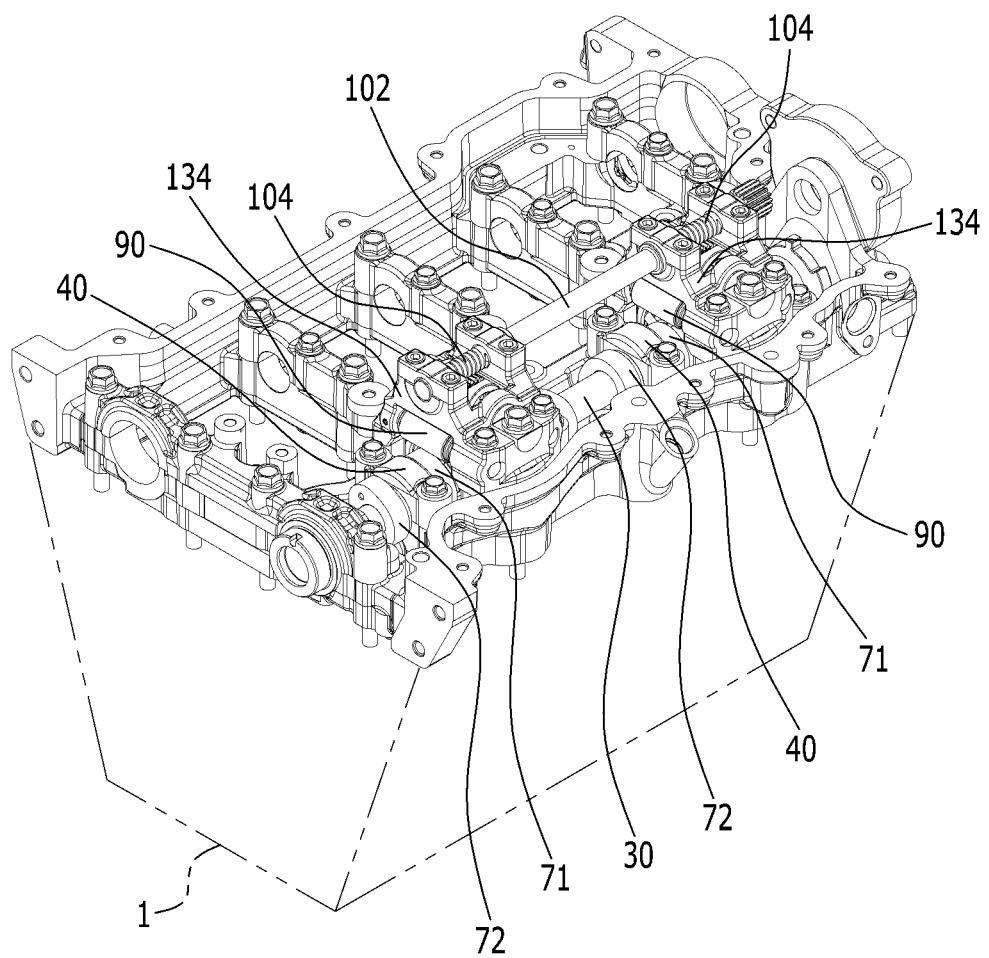
FIG. 1 is a perspective view of an engine provided with a continuously variable valve duration apparatus as an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain exemplary forms of the present disclosure have been shown and described, simply by way of illustration.

As those skilled in the art would realize, the described forms may be modified in various different ways, all without departing from the spirit or scope of the present disclosure A part irrelevant to the description will be omitted to clearly describe the present disclosure, and the same or similar elements will be designated by the same reference numerals throughout the present disclosure.

In the drawings, the thickness of layers, films, panels, regions, etc., are exaggerated for clarity.

Throughout the present disclosure and the claims, unless explicitly described to the contrary, the word "comprise" and variations such as "comprises" or "comprising", will be understood to imply the inclusion of stated elements but not the exclusion of any other elements.

An exemplary form of the present disclosure will hereinafter be described in detail with reference to the accompanying drawings.

Figure 2:
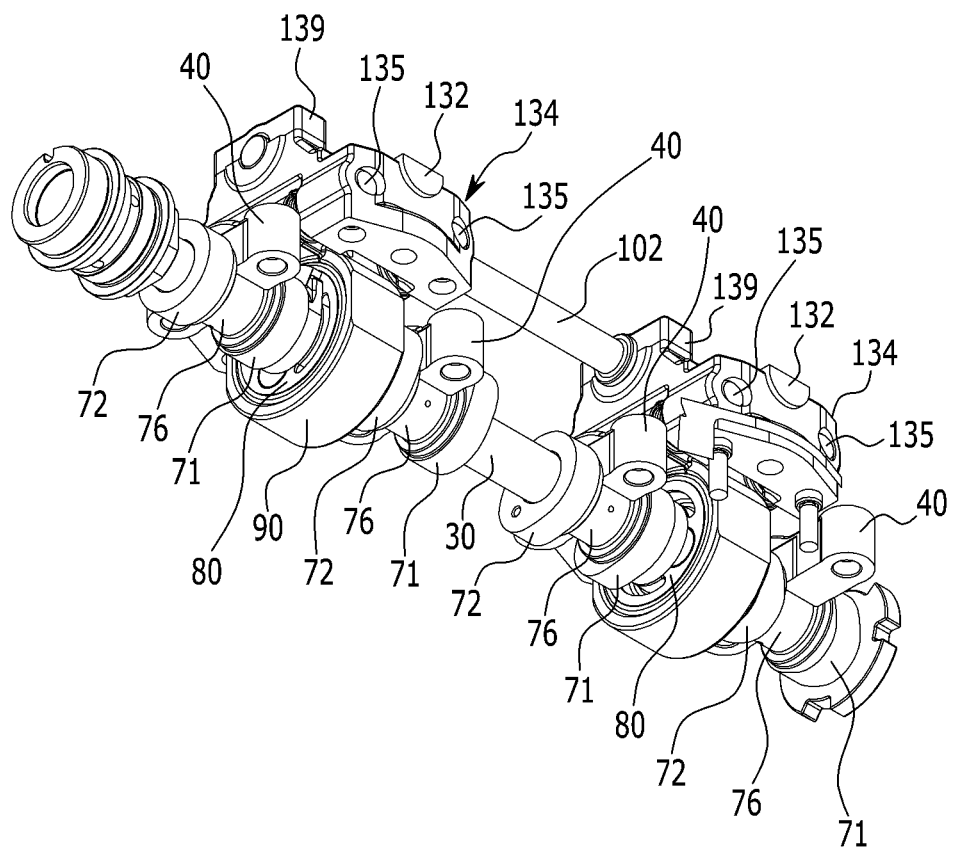
FIG. 2 is a perspective view of a continuously variable valve duration apparatus in one form of the present disclosure.

FIG. 1 is a perspective view of an engine provided with a continuously variable valve duration apparatus according to an exemplary form of the present disclosure and FIG. 2 is a perspective view of a continuously variable valve duration apparatus according to an exemplary form of the present disclosure.

Figure 3:
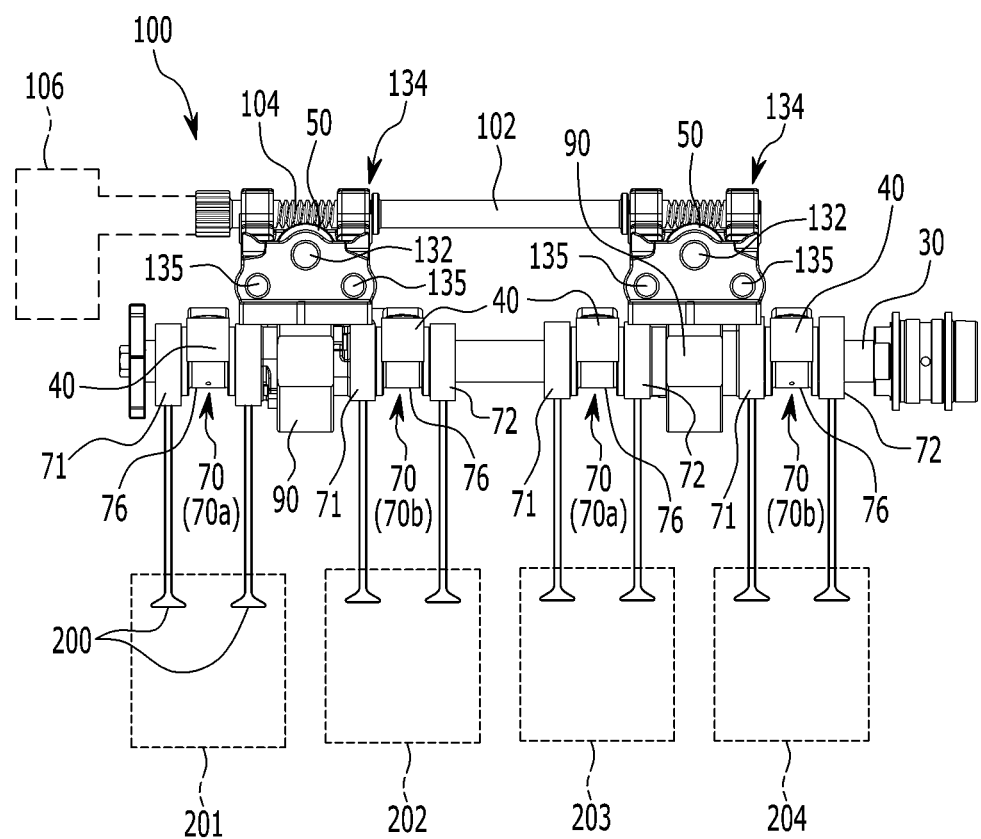
FIG. 3 is a side view of a continuously variable valve duration apparatus according to an exemplary form of the present disclosure.
Figure 4:
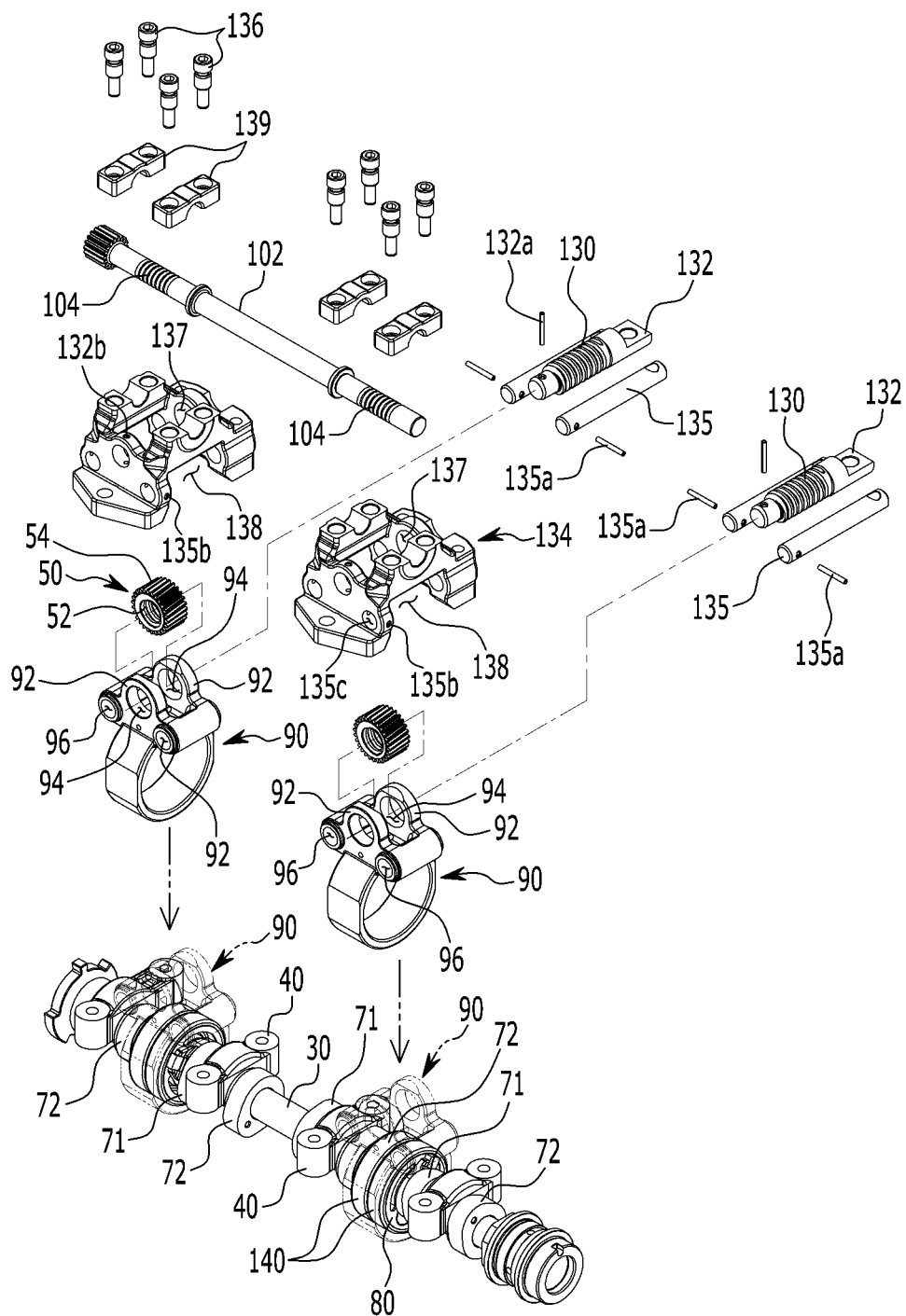
FIG. 4 is an exploded perspective view of a continuously variable valve duration in an exemplary form of the present disclosure.

FIG. 3 is a side view of a continuously variable valve duration apparatus according to an exemplary form of the present disclosure and FIG. 4 is an exploded perspective view of a continuously variable valve duration apparatus according to an exemplary form of the present disclosure.

Figure 5:
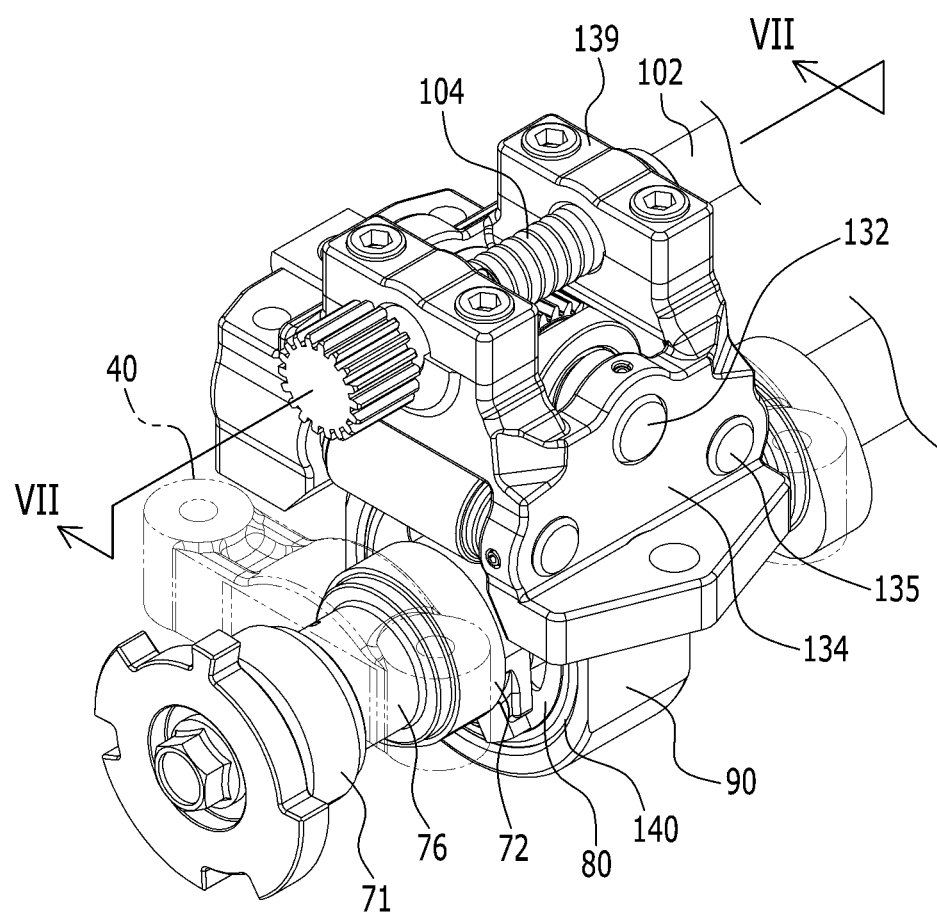
FIG. 5 is a partial exploded perspective view of a continuously variable valve duration apparatus in one form of the present disclosure.
Figure 6:
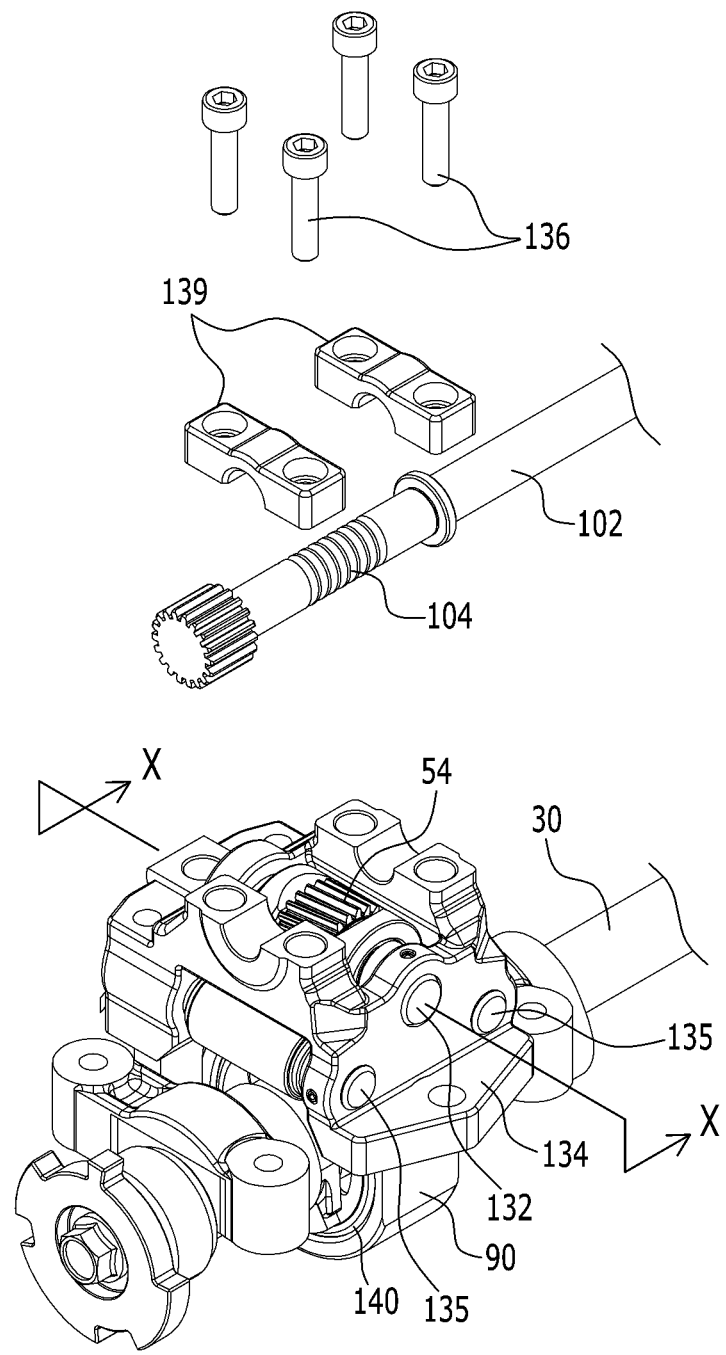
FIG. 6 is a partial exploded perspective view of a continuously variable valve duration apparatus according to an exemplary form of the present disclosure.
Figure 7:
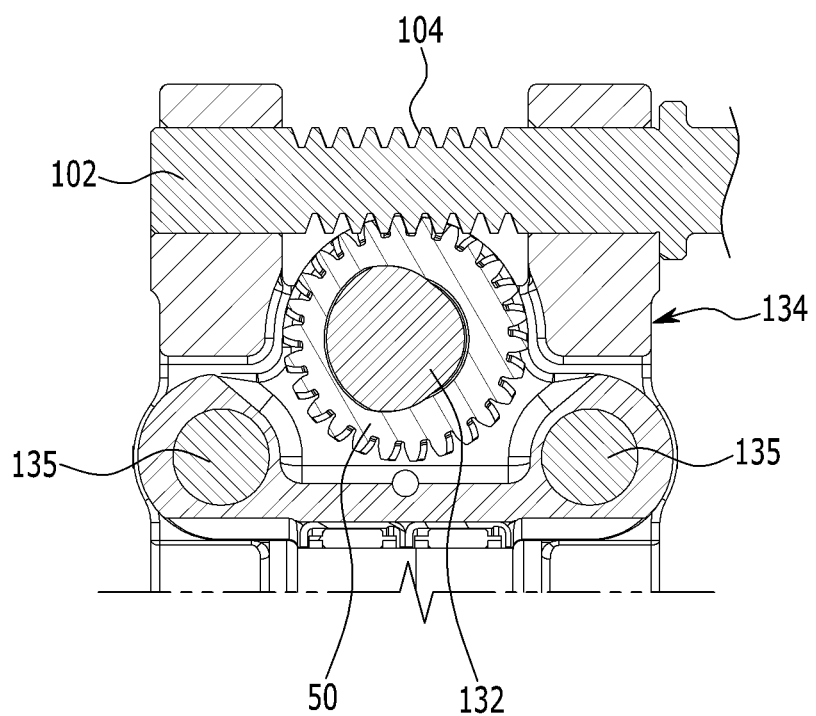
FIG. 7 is a cross-sectional view along line VII-VII of FIG. 5.

FIG. 5 is a partial exploded perspective view of a continuously variable valve duration apparatus according to an exemplary form of the present disclosure, FIG. 6 is a partial exploded perspective view of a continuously variable valve duration apparatus according to an exemplary form of the present disclosure and FIG. 7 is a cross-sectional view along line VII-VII of FIG. 5.

Referring to FIG. 1 to FIG. 7, an engine 1 includes a continuously variable valve duration apparatus.

In the drawings, 4 cylinders 211, 212, 213 and 214 are formed in the engine, but it is not limited thereto.

A continuously variable valve duration apparatus according to an exemplary form of the present disclosure includes: a camshaft 30, a cam unit 70 on which a cam 71 is formed and of which the camshaft 30 is inserted thereto, an inner wheel 80 configured for transmitting rotation of the camshaft 30 to the cam unit 70, a wheel housing 90 into which the inner wheel 80 is rotatably inserted and movable perpendicular to the camshaft 30, a guide shaft 132 on which a guide screw thread 130 is formed and disposed perpendicular to the camshaft 30, a worm wheel 50 to which an inner screw thread 52 configured for engaging with the guide screw thread 130 is formed therewithin and the worm wheel 50 disposed within the wheel housing 90 and a control shaft 102 on which a control worm 104 configured for engaging with the worm wheel 50 is formed. The control worm 104 is engaged with an outer screw thread 54 formed outer periphery of the worm wheel 50.

The continuously variable valve duration apparatus further includes a guide bracket 134 to which the guide shaft 132 is mounted.

In this case, a valve duration means opening duration of a valve, that is a duration from valve opening and to valve closing.

The camshaft 30 may be an intake camshaft or an exhaust camshaft.

A fixing hole 137 to which the guide shaft 132 is fixed and a moving space 138 within which the wheel housing is movable is formed in the guide bracket 134.

Two guide walls 92 are formed protruded from the wheel housing 90 and a moving hole 94 in which the guide shaft 132 is inserted is formed in each guide wall 92.

The worm wheel 50 is disposed between the guide walls 92 and selectively rotates to push the guide wall 92 for the wheel housing 90 to be moved.

The continuously variable valve duration apparatus further includes a sliding shaft 135 fixed to the guide bracket 134 through a hole 135c configured for guiding movement of the wheel housing 90 and a sliding hole 96 into which the sliding shaft 135 is inserted is formed in the wheel housing 90.

The continuously variable valve duration apparatus further includes a worm shaft cap 139 fixed to the guide bracket 134 configured for supporting the control shaft 102. The worm shaft cap 139 may be fixed to the guide bracket 134 through bolts 136.

A connecting scheme of the guide bracket 134, the wheel housing 90 and the worm wheel 50 may be done simply and minimize a layout of the continuously variable valve duration apparatus.

The guide shaft 132 may be mounted to the guide bracket 134 through a hole 132b formed in the guide bracket 134 by inserting a connecting pin 132a.

Also, the sliding shaft 135 may be mounted to the guide bracket 134 through a hole 135b formed in the guide bracket 134 by inserting a connecting pin 135a.

Figure 8:
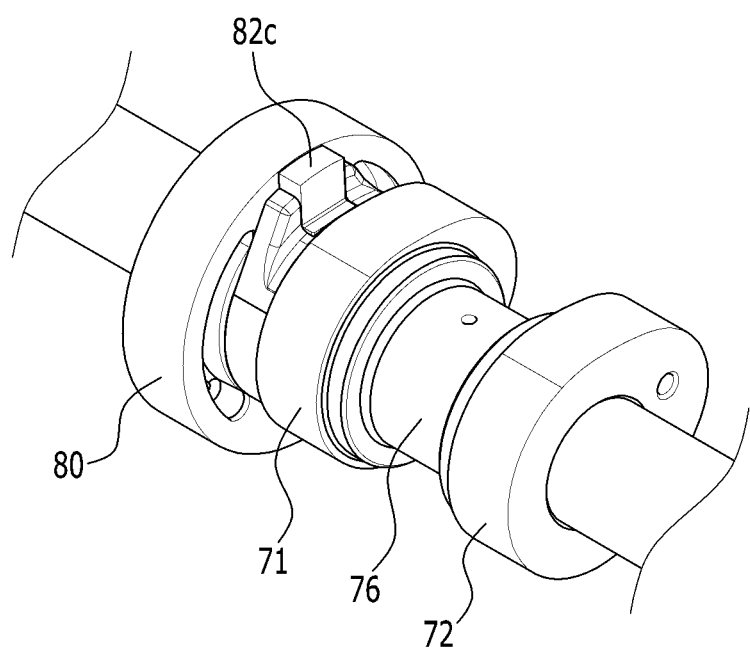
FIG. 8 and FIG. 9 are drawings showing an inner wheel and a cam unit of a continuously variable valve duration apparatus according to an exemplary form of the present disclosure.
Figure 9:
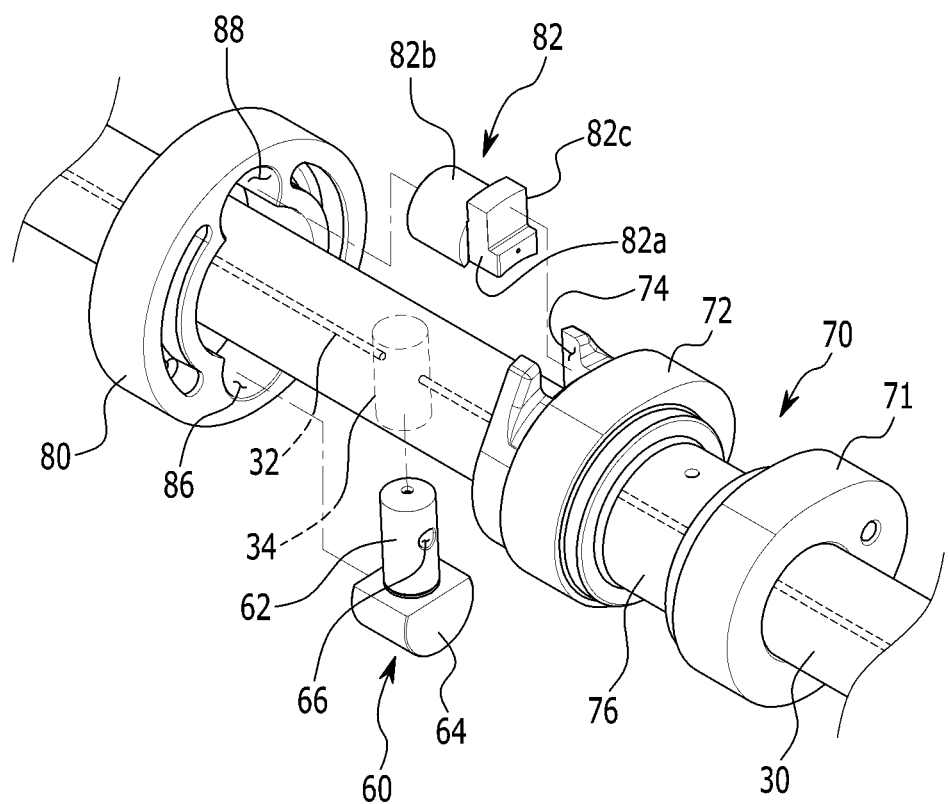
Figure 10A:
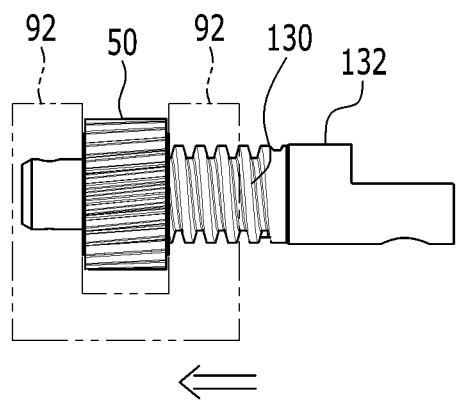
FIGS. 10A-10B are cross-sectional views along line X-X of FIG. 6.
Figure 10B:
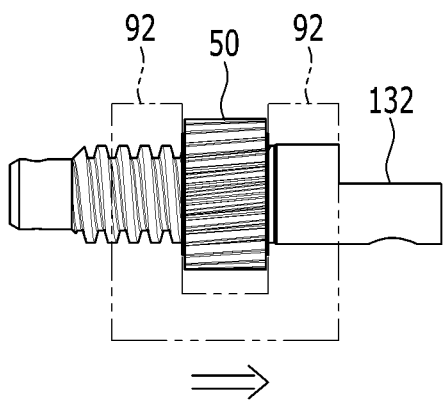

FIG. 8 and FIG. 9 are drawings showing an inner wheel and a cam unit of a continuously variable valve duration apparatus according to an exemplary form of the present disclosure and FIGS. 10A and 10B are cross-sectional views along line X-X of FIG. 6.

Figure 11:
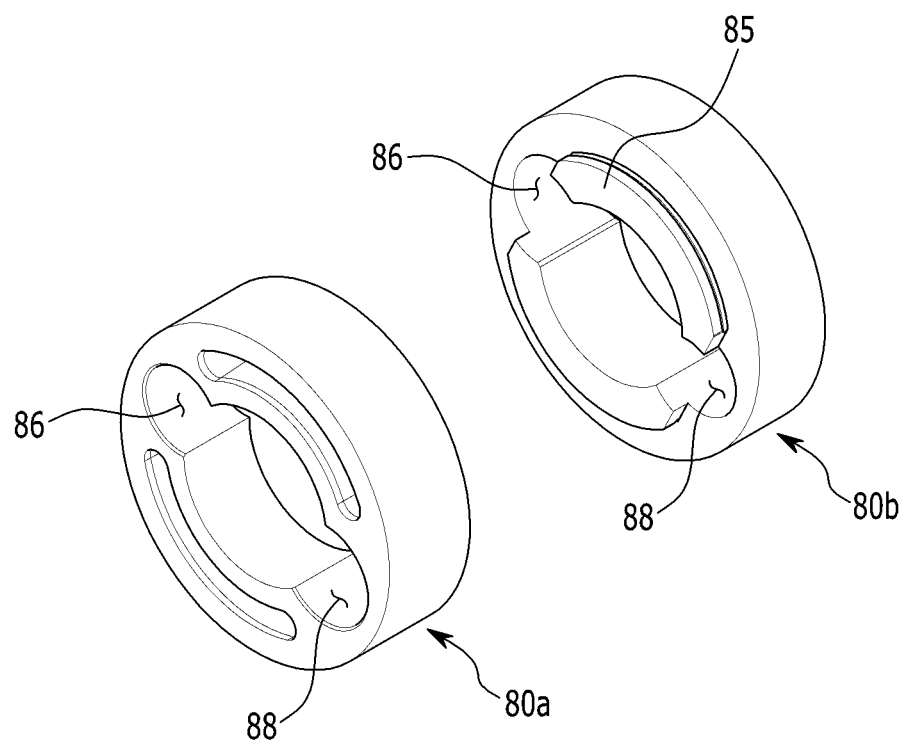
FIG. 11 and FIG. 12 are drawings showing an inner wheel of a continuously variable valve duration apparatus according to an exemplary form of the present disclosure.
Figure 12:
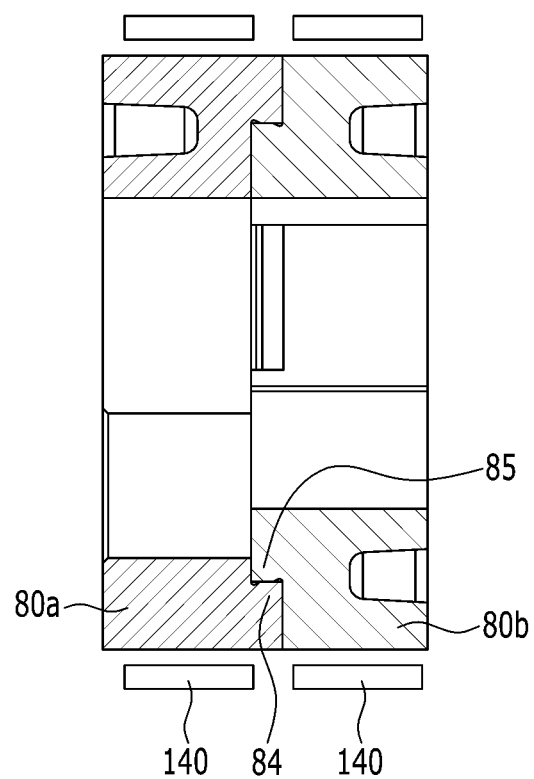

FIG. 11 and FIG. 12 are drawings showing an inner wheel of a continuously variable valve duration apparatus according to an exemplary form of the present disclosure.

Referring to FIG. 1 to FIG. 12, a first sliding hole 86 and a second sliding hole 88 are formed in the inner wheel 80 and a cam slot 74 is formed in the cam unit 70.

The continuously variable valve duration apparatus further includes a roller wheel 60 connected to the camshaft 30 and rotatably inserted into the first sliding hole 86 and a roller cam 82 slidably inserted into the cam slot 74 and rotatabley inserted into the second sliding hole 88.

The roller cam 82 includes a roller cam body 82a slidably inserted into the cam slot 74 and a cam head 82b rotatably inserted into the second sliding hole 88.

A protrusion 82c is formed at the roller cam 82 for preventing the roller cam 82 from being separated from the inner wheel 80 along the longitudinal direction of the camshaft 30.

The roller wheel 60 includes a wheel body 62 slidably connected to the camshaft 30 and a wheel head 64 rotatably inserted into the first sliding hole 86 and the wheel body 62 and the wheel head 64 may be integrally formed.

A camshaft hole 34 is formed in the camshaft 30, the wheel body 62 of the roller wheel 60 is movably inserted into the camshaft hole 34 and the wheel head 64 is rotatably inserted into the first sliding hole 86.

A camshaft oil hole 32 is formed within the camshaft 30 along a longitudinal direction thereof, a body oil hole 66 communicated with the camshaft oil hole 32 is formed in the wheel body 62 of the roller wheel 60 and an oil groove 68 (referring to FIG. 13) communicated with the body oil hole 66 is formed in the wheel head 64 of the roller wheel 60.

Lubricant supplied to the camshaft oil hole 32 may be supplied to the inner wheel 80 through the body oil hole 66, the communicate hole 69 and the oil groove 68.

The cam unit 70 includes a first cam portion 70a and a second cam portion 70b which are disposed corresponding to a cylinder and an adjacent cylinder respectively, for example the first cylinder 201 and the adjacent second cylinder 202 and the inner wheel 80 includes a first inner wheel 80a and a second inner wheel 80b transmitting rotation of the camshaft 30 to the first cam portion 70a and the second cam portion 70b respectively.

The continuously variable valve duration apparatus further includes a bearing 140 disposed within the wheel housing 90 for supporting the first inner wheel 80a and the second inner wheel 80b.

The bearing 140 may be a needle bearing, the first and the second inner wheels 80a and 80b are disposed within one wheel housing 90 and the bearing 140 may rotatably support the first and the second inner wheels 80a and 80b.

Since the first and the second inner wheels 80a and 80b are disposed within one wheel housing 90, element numbers may be reduced, so that productivity and manufacturing economy may be enhanced.

The first inner wheel 80a and the second inner wheel 80b within the wheel housing 90 may be connected rotatable to each other. For example, a first inner wheel connecting portion 84 and a second inner wheel connecting portion 85 are formed in the first inner wheel 80a and the second inner wheel 80b respectively, and the first inner wheel connecting portion 84 and the second inner wheel connecting portion 85 are connected to each other.

In the drawing, the first inner wheel connecting portion 84 and the second inner wheel connecting portion 85 are formed as convex and concave, it is not limited thereto. The first inner wheel 80a and the second inner wheel 80b are connected rotatable to each other with variable connecting structures.

In the case that the first inner wheel 80a and the second inner wheel 80b are connected, looseness or vibration due to manufacturing tolerances of the bearing, the inner wheel, the lifter and so on may be reduced.

Two cams 71 and 72 may be formed on the first and the second cam portions 70a and 70b as a pair and a cam cap connecting portion 76 is formed between the paired cams 71 and 72 of each of the first and second cam portions 70a and 70b.

The cam 71 and 72 rotate and open the valve 200.

The continuously variable valve timing apparatus further includes a cam cap 40 on which a cam supporting portion 46 configured to rotatably support the cam cap connecting portion 76 is formed on the cam cap 40.

Figure 13:
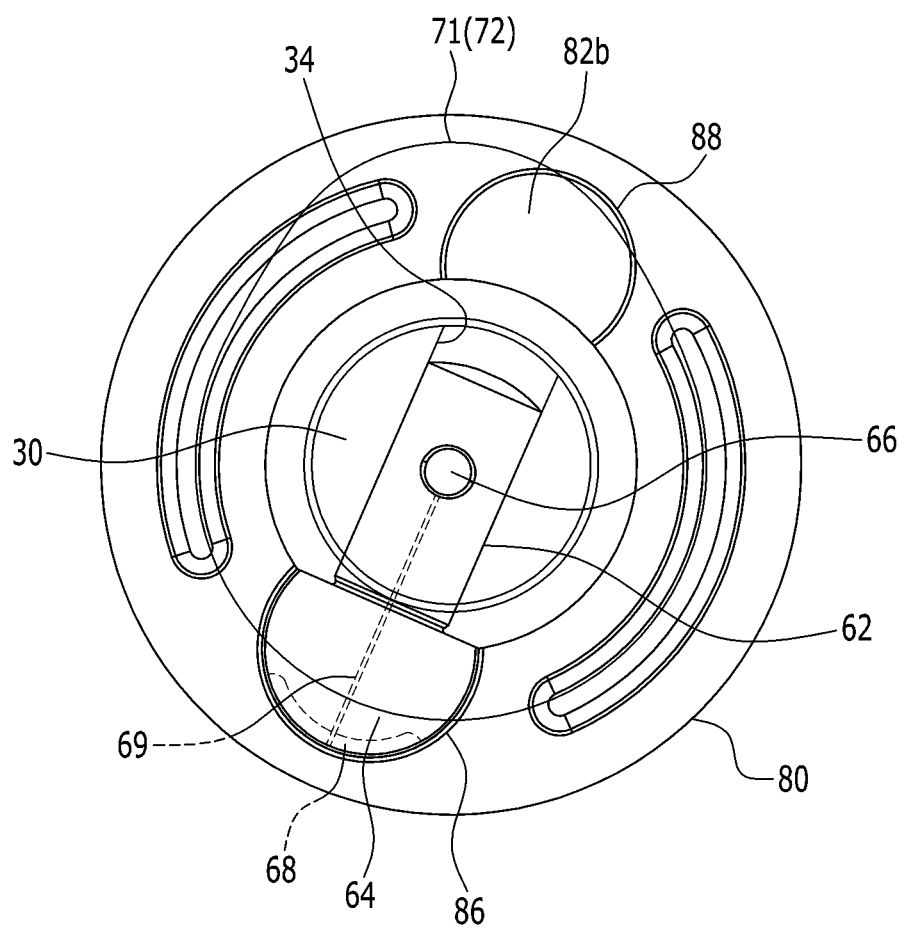
FIG. 13 to FIG. 15 are drawings showing operations of an inner wheel of a continuously variable valve duration apparatus according to an exemplary form of the present disclosure.
Figure 14:
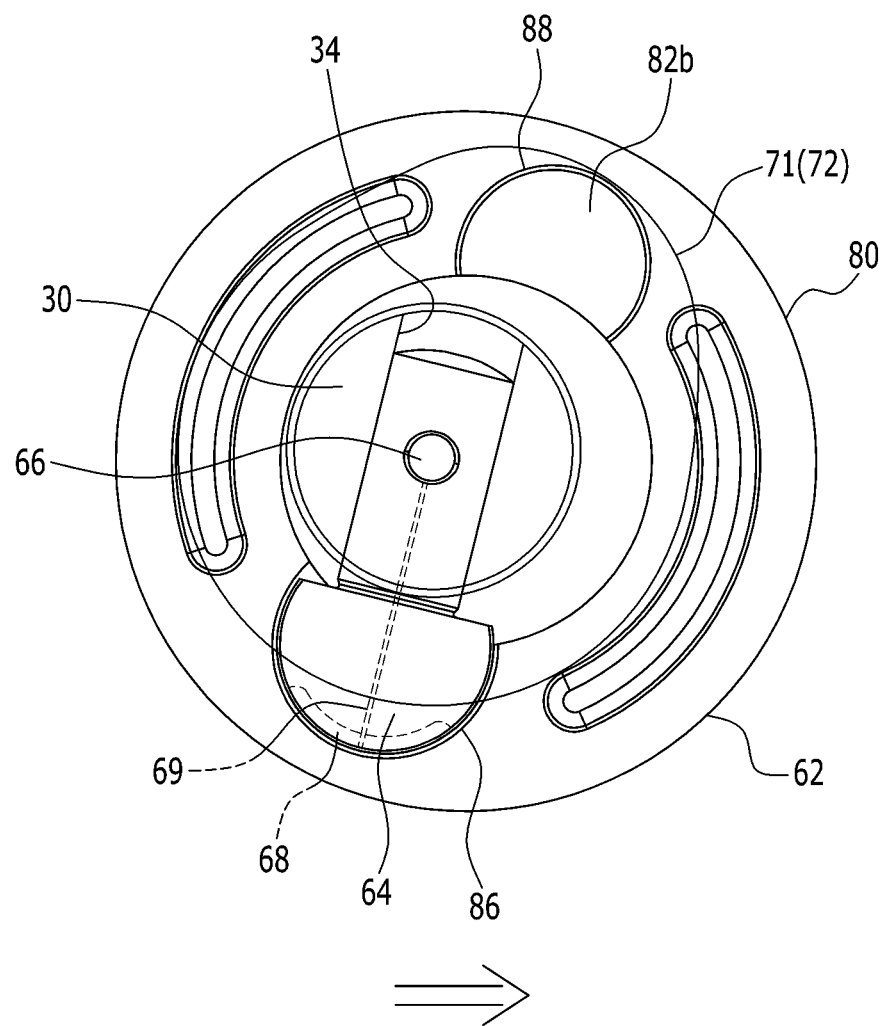
Figure 15:
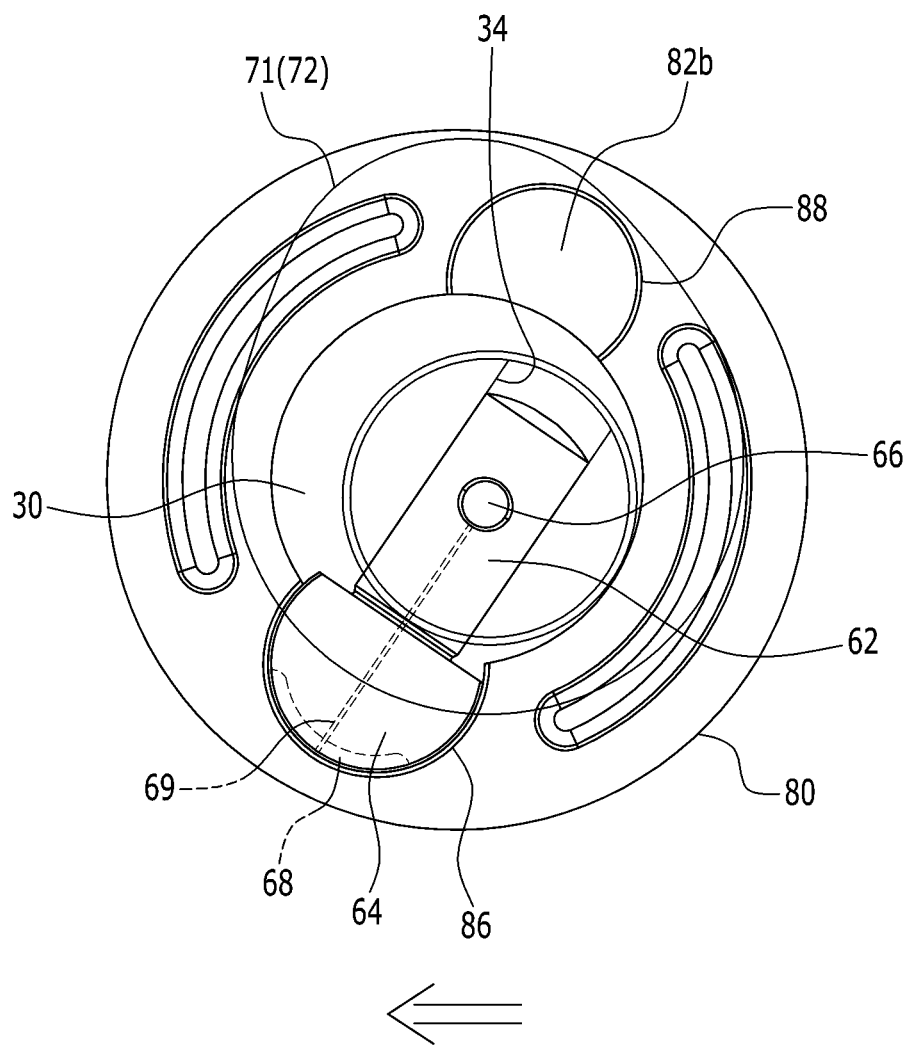
Figure 16:
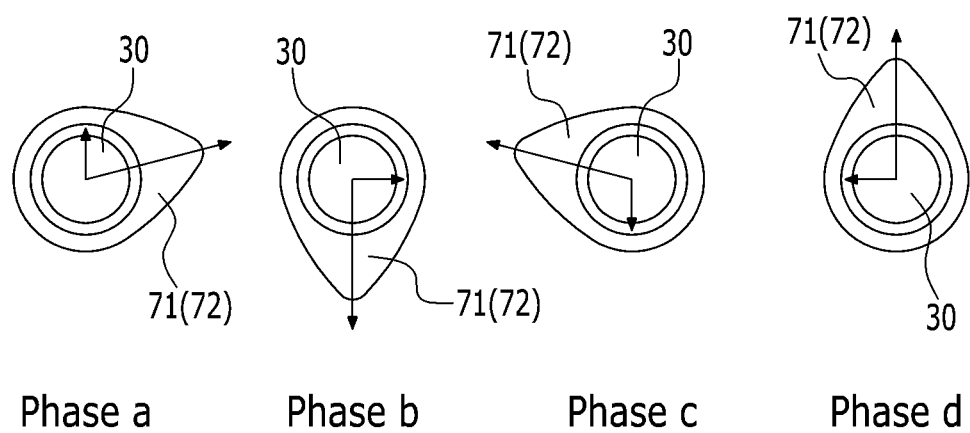
FIG. 16 and FIG. 17 are drawings showing operations of a continuously variable valve duration apparatus according to an exemplary form of the present disclosure.
Figure 17:
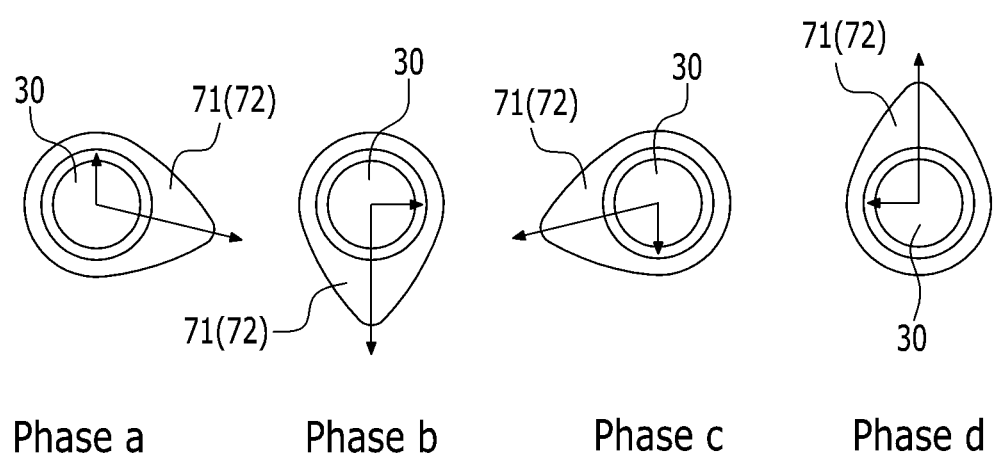

FIG. 13 to FIG. 15 are drawings showing operations of an inner wheel of a continuously variable valve duration apparatus according to an exemplary form of the present disclosure and FIG. 16 and FIG. 17 are drawings showing operations of a continuously variable valve duration apparatus according to an exemplary form of the present disclosure.

As shown in FIG. 13, when rotation centers of the camshaft 30 and the cam unit 70 are coincident, the cams 71 and 72 rotate with the same phase angle of the camshaft 30.

According to engine operation states, an ECU (engine control unit or electric control unit) transmits control signals to the control portion 100, and then the control motor 120 rotates the control shaft 102.

Then, the control worm 104 rotates the formed outer periphery of the worm wheel 50. And since the inner screw thread 52 formed in the worm wheel 50 is engaged with the guide screw thread 130 and thus the worm wheel 50 moves along the guide screw thread 130.

As shown in FIGS. 10A-10B, FIG. 14 and FIG. 15, the worm wheel 50 moves along the guide shaft 132 according to rotation of the control shaft 102 and the worm wheel 50 pushes the guide wall 92, and thus a relative position of the wheel housing 90 with respect to the camshaft 30 is changed.

When the relative position of the wheel housing 90 with respect to the camshaft 30 is changed, the relative rotation speed of the cams 71 and 72 with respect to the rotation speed of the camshaft 30 is changed.

While the roller wheel 60 is rotated together with the camshaft 30, the wheel body 62 is slidable within the camshaft hole 34, the wheel head 64 is rotatable within the first sliding hole 86, and the roller cam 82 is rotatably within the second sliding hole 88 and slidable within the cam slot 74. Thus, the relative rotation speed of the cams 71 and 72 with respect to the rotation speed of the camshaft 30 is changed.

When the rotation center of the wheel housing 90 with respect to the camshaft 30 moves to one direction, the rotation speed of the cams 71 and 72 are relatively faster than rotation speed of the camshaft 30 from phase a to phase b and from phase b to phase c, then the rotation speed of the cams 71 and 72 are relatively slower than rotation speed of the camshaft 30 from phase c to phase d and from phase d to phase a as shown in FIG. 16.

When the rotation center of the wheel housing 90 with respect to the camshaft 30 moves to the opposite direction, the rotation speed of the cams 71 and 72 are relatively slower than rotation speed of the camshaft 30 from phase a to phase b and from phase b to phase c, then the rotation speed of the cams 71 and 72 are relatively faster than rotation speed of the camshaft 30 from phase c to phase d and from phase d to phase a as shown in FIG. 17.

Figure 18A:
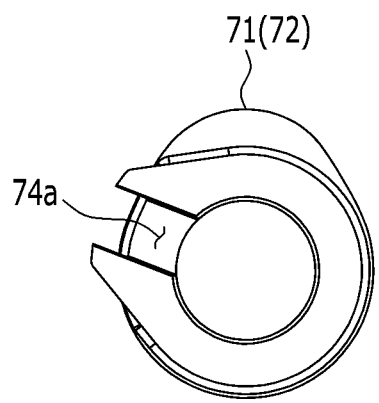
FIGS. 18A-18B are drawings showing a cam slot of a continuously variable valve duration apparatus according to an exemplary form of the present disclosure.
Figure 18B:
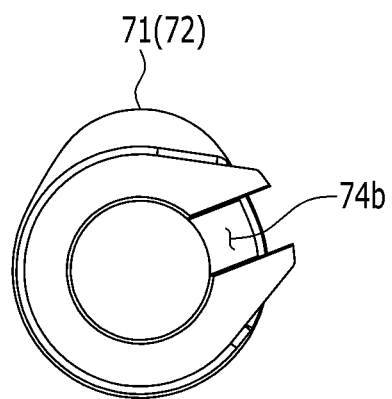
Figures 19A, 19B, 19C:
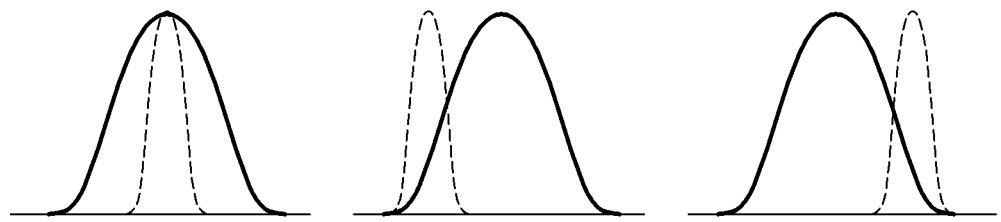
FIGS. 19A-19C are graphs each showing valve profile of a continuously variable valve duration apparatus according to an exemplary form of the present disclosure.

FIGS. 18A and 18B are drawings each showing a cam slot of a continuously variable valve duration apparatus according to an exemplary form of the present disclosure and FIGS. 19A-19C are graphs each showing a valve profile of a continuously variable valve duration apparatus according to an exemplary form of the present disclosure.

As shown in FIGS. 18A-18B, the cam slot 74 may be formed more retarded than a position of the cam 71 or 72 (referring to (74a) of FIG. 18A) or the cam slot 74 may be formed more advanced than a position of the cam 71 or 72 (referring to (74b) of FIG. 18B), or the cam slot 74 may be formed with the same phase of the cam 71 or 72. With the above scheme, various valve profiles may be achieved.

Although maximum lift of the valve 200 is constant, the rotation speed of the cam 71 and 72 with respect to the rotation speed of the camshaft 30 is changed according to relative positions of the slider housing 90 so that closing and opening time of the valve 200 is changed. That is, duration of the valve 200 is changed.

According to the relative position of the cam slot 74, mounting angle of the valve 200 and so on, opening and closing time of the valve may be simultaneously changed as shown in FIG. 19A.

While opening time of the valve 200 is constant, closing time of the valve 200 may be retarded or advanced as shown in FIG. 19B.

While closing time of the valve 200 is constant, opening time of the valve 200 may be retarded or advanced as shown in FIG. 19C.

As described above, a continuously variable valve duration apparatus according to an exemplary form of the present disclosure may achieve various valve duration with a simple construction.

The continuously variable valve duration apparatus according to an exemplary form of the present disclosure may be reduced in size and thus the entire height of a valve train may be reduced.

Since the continuously variable valve duration apparatus may be applied to an existing engine without excessive modification, thus productivity may be enhance and production cost may be reduced.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

| | |
|---|---|
| 1: engine | 30: camshaft |
| 32: camshaft oil hole | 34: camshaft hole |
| 40: cam cap | 50: worm wheel |
| 52: inner screw thread | 54: outer screw thread |
| 60: roller wheel | 62: wheel body |
| 64: wheel head | 66: body oil hole |
| 68: oil groove | 69: communicate hole |
| 70: cam unit | 70a, 70b: first/second cam portions |
| 71, 72: cam | 74: cam slot |
| 76: cam connecting portion | 80: inner wheel |
| 82: roller cam | 82a: roller cam body |
| 82b: roller cam head | 82c: protrusion |
| 83: cam slot | 84: first inner wheel connecting portion |
| 85: second inner wheel connecting portion | 86: first sliding hole |
| 88: second sliding hole | 90: wheel housing |
| 92: guide wall | 94: moving hole |
| 96: sliding hole | 100: controller |
| 102: control shaft | 104: control worm |
| 106: control motor | 130: guide screw thread |
| 132: guide shaft | 134: guide bracket |
| 135: sliding shaft | 136: bolt |
| 137: fixing hole | 138: moving space |
| 139: worm shaft cap | 140: bearing |
| 200: valve | 211-214: 1, 2, 3, 4 cylinders |

What is claimed is:

1. A continuously variable valve duration (CVVD) apparatus, comprising:
   a camshaft inserted into a cam unit, the cam unit including a cam;

an inner wheel configured to transmit rotation of the camshaft to the cam unit, the inner wheel is rotatably inserted into a wheel housing so as to move perpendicular to the camshaft;
a guide shaft, including a guide screw thread, disposed perpendicular to the camshaft;
a worm wheel, including an inner screw thread configured to engage with the guide screw thread, disposed within the wheel housing; and
a control shaft, including a control worm configured to engage with an outer screw thread of the worm wheel, disposed parallel to the camshaft.

2. The CVVD apparatus of claim 1, wherein the guide shaft is mounted to a guide bracket.

3. The CVVD apparatus of claim 2, wherein the guide bracket includes a fixing hole and a moving space such that the guide shaft is fixed to the fixing hole and the wheel housing moves within the moving space.

4. The CVVD apparatus of claim 2, further comprising:
a first guide wall and a second guide wall protruding from the wheel housing; and
a first moving hole and a second moving hole formed in the first guide wall and the second guide wall, respectively,
wherein the guide shaft is configured to be inserted into the first and second moving holes.

5. The CVVD apparatus of claim 4, wherein the worm wheel is disposed between the first and second guide walls such that the worm wheel moves the wheel housing by selectively pushing on one of the first and second guide walls when the worm wheel rotates about the guide shaft.

6. The CVVD apparatus of claim 2, further comprising:
a sliding shaft fixed to the guide bracket; and
a sliding hole formed in the wheel housing,
wherein the sliding shaft is configured to be inserted into the sliding hole so as to guide movement of the wheel housing.

7. The CVVD apparatus of claim 2, further comprising a worm shaft cap fixed to the guide bracket, wherein the worm shaft cap is configured to support the control shaft.

8. The CVVD apparatus of claim 1, further comprising:
a first sliding hole and a second sliding hole formed in the inner wheel;
a cam slot formed in the cam unit;
a roller wheel slidably connected to the camshaft and rotatably inserted into the first sliding hole; and
a roller cam slidably inserted into the cam slot and rotatably inserted into the second sliding hole.

9. The CVVD apparatus of claim 8, wherein the roller cam comprises:
a roller cam body slidably inserted into the cam slot;
a cam head rotatably inserted into the second sliding hole; and
a protrusion configured to inhibit the roller cam from being removed.

10. The CVVD apparatus of claim 8, wherein the roller wheel comprises:
a wheel body slidably connected to the camshaft; and
a wheel head rotatably inserted into the first sliding hole.

11. The CVVD apparatus of claim 8, further comprising:
a camshaft oil hole formed within the camshaft along a longitudinal direction of the camshaft;
a body oil hole formed in a wheel body of the roller wheel; and
an oil groove formed in a wheel head of the roller wheel,
wherein the camshaft oil hole is configured to communicate with the oil groove via the body oil hole.

12. The CVVD apparatus of claim 1, wherein:
the cam unit includes a first cam portion and a second cam portion corresponding to a cylinder and an adjacent cylinder, respectively; and
the inner wheel includes a first inner wheel and a second inner wheel configured to transmit the rotation of the camshaft to the first cam portion and the second cam portion, respectively.

13. The CVVD apparatus of claim 12, wherein the first inner wheel and the second inner wheel are rotatably connected to each other.

14. The CVVD apparatus of claim 12, further comprising a bearing disposed within the wheel housing, wherein the bearing is configured to support the first inner wheel and the second inner wheel.

15. The CVVD apparatus of claim 12, wherein the first cam portion and the second cam portion each include:
a cam connecting portion formed between two cams; and
a cam supporting portion formed in a cam cap so as to support the cam connecting portion.

16. An engine comprising the CVVD apparatus of claim 1.

* * * * *